United States Patent
Mueller et al.

(10) Patent No.: US 7,350,210 B2
(45) Date of Patent: Mar. 25, 2008

(54) GENERIC DATA PERSISTENCE APPLICATION PROGRAM INTERFACE

(75) Inventors: Helmut Mueller, Merchweiler (DE); Jochen Saterdag, St. Leon-Rot (DE); Claudius Fischer, Schwetzingen (DE); Thorsten Stephan, Heidelberg (DE)

(73) Assignee: SAP AG, Walldorf (DE)

( * ) Notice: Subject to any disclaimer, the term of this patent is extended or adjusted under 35 U.S.C. 154(b) by 710 days.

(21) Appl. No.: 10/720,285

(22) Filed: Nov. 25, 2003

(65) Prior Publication Data

US 2004/0230556 A1   Nov. 18, 2004

Related U.S. Application Data

(60) Provisional application No. 60/429,474, filed on Nov. 25, 2002, provisional application No. 60/429,470, filed on Nov. 25, 2002, provisional application No. 60/429,789, filed on Nov. 25, 2002, provisional application No. 60/429,859, filed on Nov. 26, 2002, provisional application No. 60/429,563, filed on Nov. 26, 2002, provisional application No. 60/429,690, filed on Nov. 26, 2002.

(51) Int. Cl.
*G06F 3/00* (2006.01)

(52) U.S. Cl. .................................................... 719/310

(58) Field of Classification Search ................ 719/328, 719/310; 718/1
See application file for complete search history.

(56) References Cited

U.S. PATENT DOCUMENTS

| | | | | |
|---|---|---|---|---|
| 5,903,753 | A * | 5/1999 | Bramnick et al. | 719/328 |
| 6,018,743 | A * | 1/2000 | Xu | 707/103 R |
| 6,714,968 | B1 * | 3/2004 | Prust | 709/219 |
| 6,854,115 | B1 * | 2/2005 | Traversat et al. | 718/1 |
| 2003/0055809 | A1 * | 3/2003 | Bhat | 707/1 |

* cited by examiner

*Primary Examiner*—William Thomson
*Assistant Examiner*—LeChi Truong
(74) *Attorney, Agent, or Firm*—Kenyon & Kenyon LLP

(57) ABSTRACT

A method and system to make data persistent in data storage using a generic application interface. An embodiment of the method may include providing the generic data persistence interface to store data independent of data storage mechanisms. The interface may include generic routines commonly shared by the data storage mechanisms. The method may further include calling the generic routines as a function of a particular data storage mechanism upon receiving an request and executing the called routines. The interface provides a unique identifier associated with the data to store with the data in persistent storage. Exemplary applications include persistent file storage and persistent JDBC database storage.

10 Claims, 7 Drawing Sheets

GENERIC DATA PERSISTENCE APPLICATION PROGRAM INTERFACE

CROSS REFERENCE TO RELATED APPLICATIONS

This application claims priority to U.S. Provisional Application No. 60/429,474, filed Nov. 25, 2002, U.S. Provisional Application No. 60/429,470, filed Nov. 25, 2002, U.S. Provisional Application No. 60/429,789, filed Nov. 25, 2002, U.S. Provisional Application No. 60/429,859, filed Nov. 26, 2002, U.S. Provisional Application No. 60/429,563, filed Nov. 26, 2002, and U.S. Provisional Application No. 60/429,690, filed Nov. 26, 2002.

FIELD OF THE INVENTION

The present invention relates to the fields of information, computer software systems, and computer networks. In particular, embodiments of the present invention provide a generic data persistence application program interface.

BACKGROUND

A computer operating system (OS) manages the hardware and software data storage resources of the computer. Applications running on the computer may deal with the data storage resources of the computer without having to know all the details about these resources. Instead, the application need only be configured with the appropriate OS functions that execute the data storage. This configuration advantageously provides an efficient operation for the application.

However, to manage data storage efficiently, the OS needs to know all the details about these resources and provide within its functions the mechanisms for handling of these details. Accordingly, the contents of the OS functions are necessarily specific to the data storage implemented by that particular OS and, therefore, unique to that particular OS. Hence, the application that calls these OS functions is also uniquely configured to run with that particular OS. If the application were run with a different OS, these functions would be unrecognizable and incompatible with the different OS. Therefore, in order to port the application to a computer with a different OS, the application must undergo significant modification to replace the OS functions. This requires significant time and labor for a system developer.

With the emergence of large computer networks having a plurality of operating systems installed on the network computers, the above approach to application design is impractical. No system can afford the time and expense of providing different versions of an application for each and every permutation of the operating systems' data storage functions in the network computers.

The Java™ Virtual Machine (VM) has been implemented to address this problem. An application may be written in Java™ programming language and then compiled to generate Java™ bytecodes that provides instructions to the Java™ VM. The Java™ VM then takes the bytecodes and translates them into instructions understood by the computer's OS, which may be Windows, Unix, or MacOS, for example.

However, there are concerns about the Java™ VM, particularly with respect to data storage. For example, the Java™ VM uses object serialization for reading objects from and writing objects to data storage. In using object serialization, the VM typically stores the entire object tree in memory in order to sufficiently reconstruct stored objects upon retrieval. However, this approach requires extremely high memory requirements. Therefore, a more efficient implementation of serializing objects, in particular, and managing data storage, in general, is needed.

Another concern with the Java™ VM is that data is lost if the VM crashes. Accordingly, a way to make data objects, in particular, and data structures, in general, persistent is needed.

Accordingly, there is a need in the art for a generic platform-independent solution to provide efficient, persistent data storage for applications regardless of the OS and the data storage resources of a computer.

SUMMARY OF INVENTION

Embodiments of the present invention provide a method for providing a generic data persistence application programming interface to store persistent data. The method may include providing the generic API to store data, independent of data storage mechanisms, using the API to call generic routines as a function of a particular data storage mechanism upon receiving an request, and executing the routines. The interface provides a unique identifier associated with the data to store with the data in order to make the data persistent.

Embodiments of the present invention also provide a system upon which the generic data persistence API may be implemented. The system may include at least one peripheral device having a data storage mechanism associated therewith and a mobile computer having the generic API. The computer may be configured to provide the interface to make data persistent, independent of the specific features of the device.

DETAILED DESCRIPTION

Embodiments of the present invention provide a method for providing a generic data persistence application programming interface to store persistent data. The method may include providing the generic API to store data, independent of data storage mechanisms, using the API to call generic routines as a function of a particular data storage mechanism upon receiving an request, and executing the called routines. The interface provides a unique identifier associated with the data to make the data persistent. Accordingly, embodiments of the generic API of the present invention advantageously offer a platform-independent data storage mechanism to provide persistent data and to manage persistent data storage efficiently.

Embodiments of the generic API further provide a great deal of flexibility such that many different data storage mechanisms can be represented in the generic API. Additionally, new features may be implemented with minimal or no disruption of the overall API framework.

Figure 1:
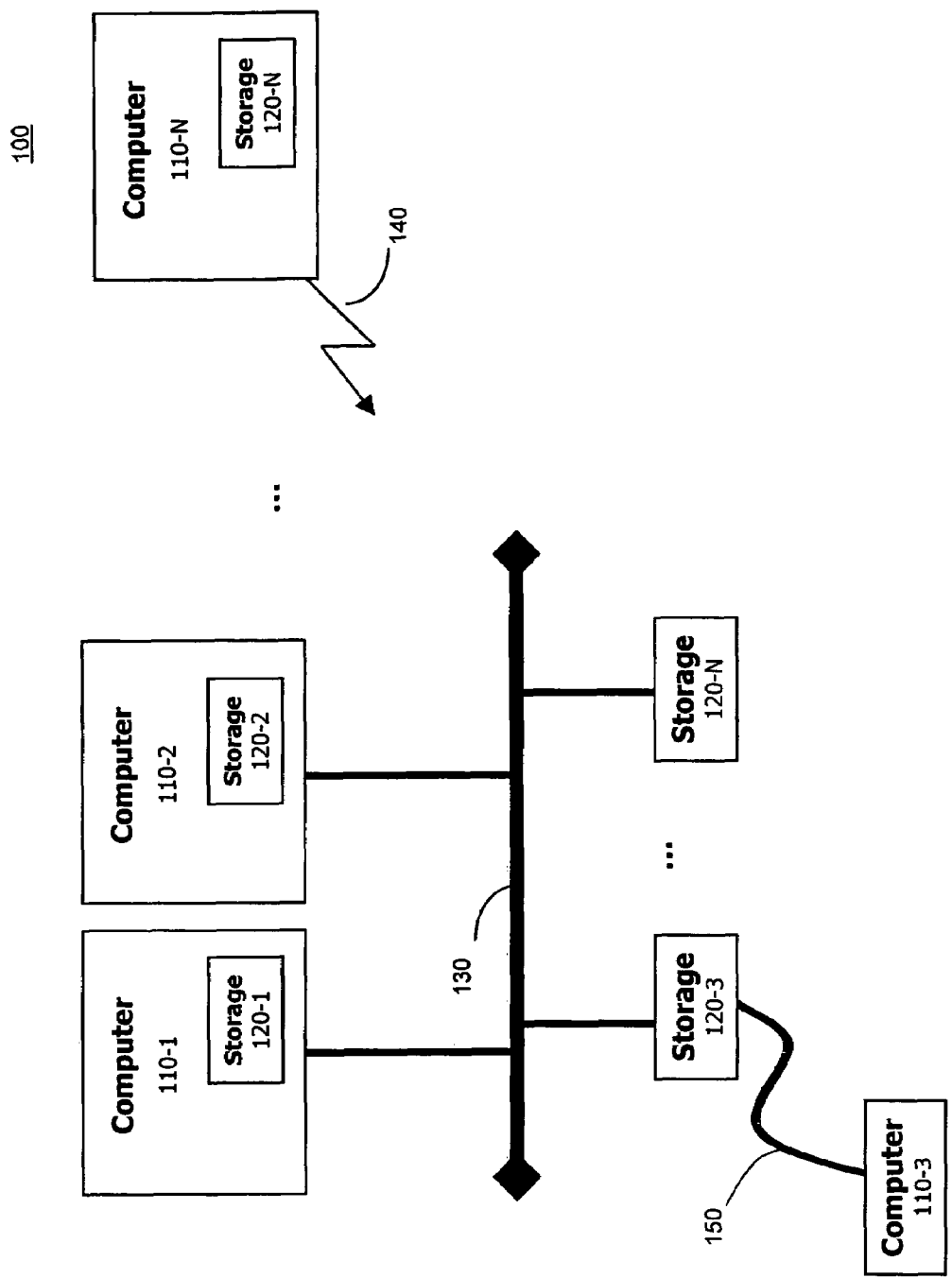
FIG. 1 is an overview of a system according to embodiments of the present invention.

FIG. 1 is an overview of a system according to embodiments of the present invention. The system may include one or more computers 110, which may be a desktop, a laptop, a handheld device, or any like device having a processor therein. The system may further include one or more data storage resources 120 in communication with the computers 110. The storage resources 120 may include external and internal storage. The computers 110 may access external storage via a local area or wide area network 130, a wireless link 140, a direct connection 150, or any like transmission media. The computers 120 may access internal storage via an internal bus. Each computer 120 may provide internal storage, external storage, or both.

Figure 2:
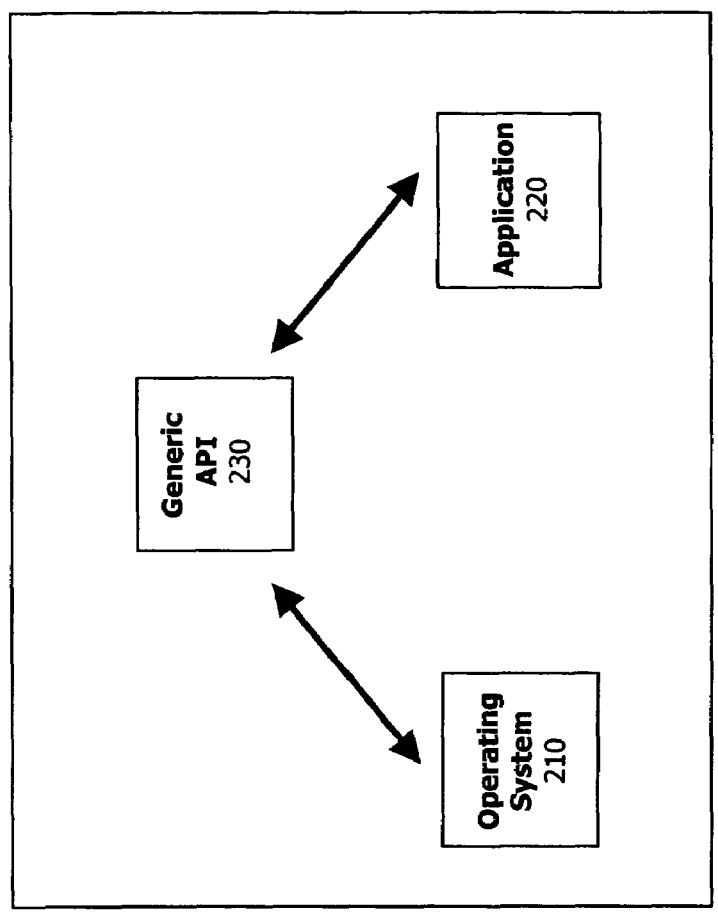
FIG. 2 is a diagram of a computer according to embodiments of the present invention.

FIG. 2 is a diagram of the computer 110 on which embodiments of the generic API may be implemented. The computer 110 may include an operating system (OS) 210, one or more applications 220, and the generic API 230. The application 220 may use the generic API 230 to command performance of some procedure by the operating system 210. The generic API 230 may in turn direct the operating system 210 to perform the procedure for the application 220. The operating system 210 may then control the allocation and usage of computer resources to carry out the application's 220 request. The data storage 120 may include a file, a byte array, a JDBC database, or any like data storage and store data according to file I/O, JDBC, or any like data storage mechanism.

In embodiments of the present invention, the application 220 may request through the generic API 230 that data write or read be performed. Upon receiving the request, the generic API 230 may then direct the OS 210 to access a particular storage resource 120. The OS 210 may then store or retrieve the data according to the mechanism of the particular data storage resource. As illustrated here, the application need not be dependent on the specific mechanism for the data storage or the particular OS. Instead, the application may request data storage or retrieval in the abstract. To which, the generic API may direct data storage or retrieval according to a platform-specific solution, where the solution may include generic routines commonly shared by data storage mechanisms.

Figure 3:
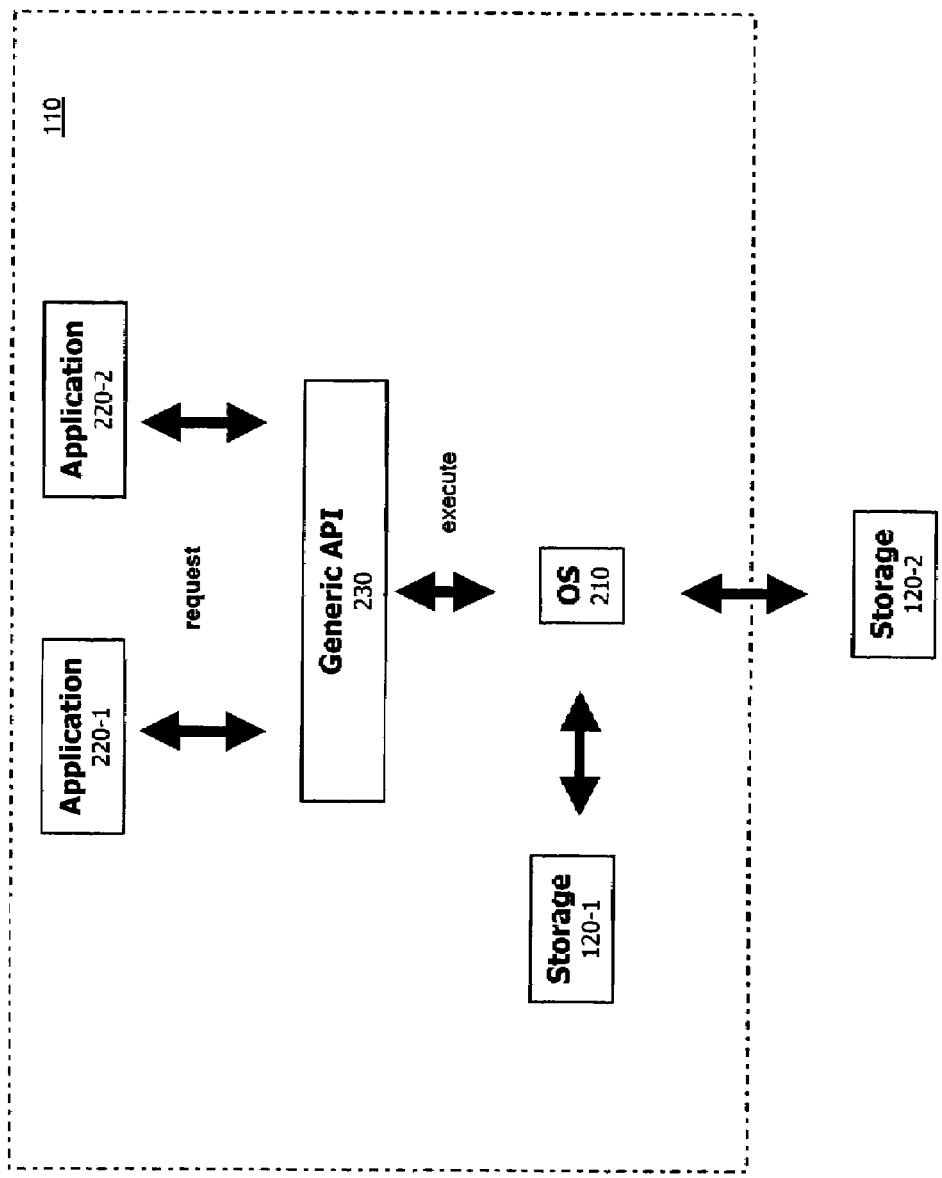
FIG. 3 is a diagram of an implementation of the generic data persistence API according to embodiments of the present invention.

FIG. 3 is a diagram of an implementation of the generic API. In this embodiment, the computer 110 may include one or more applications 220, the generic API 230, the OS 210, and internal storage 120. External to the computer 110 may be external storage 120. The application 220 may be in communication with the generic API 230 and the generic API 230 may be in communication with the OS 210. The OS 210 may in turn be in communication with the internal and external storage 120. Communication between the computer 110 and the external storage components 120 may be accomplished via a direct connection, a wireless link, a network, or any like transmission media.

As illustrated by FIG. 3, during implementation of embodiments of the present invention, one of the running applications 220 may send out a request to write data to a file, for example. The internal storage 120 mechanism may be file I/O. Accordingly, the generic API 230 may receive the write request, identify the internal storage 120 as the intended destination, call generic routines for storing the data in a file in internal storage 120, and then direct the OS 210 to store the data in the file in internal storage 120.

The generic API may be implemented with an object-oriented approach. An advantage of such an approach is that it provides efficient, self-contained objects to define data storage resources and group the complex details of their many features and options in order to store persistent data. The use of objects allows the API to group together functions that are common to all data storage such that a developer need not reproduce representations of the same functions for each OS and storage resource and the computer need not store redundant representations. Additionally, upon implementation of new data storage for an existing OS, modification of the existing implementation, or implementation of new data storage for a new OS, the generic API need not be disturbed greatly. Instead, modification may be limited to particular objects.

It is to be understood that the generic API of the present invention is not limited to the object-oriented implementation described herein, but may be implemented in a variety of ways well known in the art.

Figure 4:
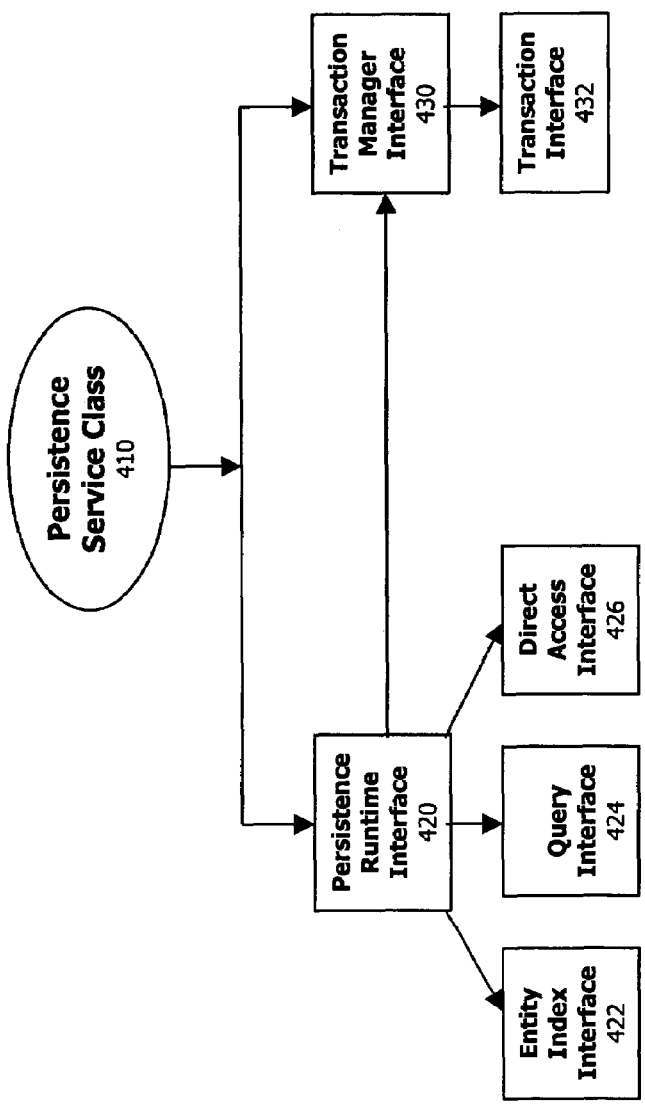
FIG. 4 is a class diagram of an exemplary implementation of the generic data persistence API.

Such an object-oriented implementation is illustrated in FIG. 4. FIG. 4 is a class diagram of an exemplary implementation of the generic API. The generic API may operate such that similar data storage functions on different operating systems 120 are implemented. And the implemented functions may make data persistent in storage.

In embodiments of the present invention, the generic API 230 may receive a request from an application 220 to read data from or write data to storage 120. The API 230 may then define a persistence service class which includes all the interfaces and classes that outline the basic functionality common to all data storage 120. The API 230 may then instantiate the persistence service class for the particular data storage 120 to be used by the application. The instantiated persistence service class may in turn instantiate its classes and interfaces to include information specific to a particular data storage 120. The object created by the instantiation may then direct the OS 210 to access the particular data storage 120 via the corresponding storage mechanism and to execute the request. The data may be represented in the generic API 230 as objects. Accordingly, an object instantiated by the persistence service class includes the data to be persisted.

The persistence service class and its associated interfaces and classes are described as follows. The persistence service class 410 is the entry point of the API. The persistence service class 410 may delegate to its associated interfaces and classes the routines for making stored data persistent. The persistence service class 410 may include a persistence runtime interface 420 and a transaction manager 430. The functionality of each of these components will be described below.

When the persistence service class is instantiated, the instantiated class includes the information specific to the OS 210 and mechanism of data storage 120 on the computer 110 that will carry out the application's request.

The persistence runtime interface 420 may outline the basic routines to manage the API during runtime, including providing access to the transaction manager interface 430, the entity index interface 422, the query interface 424, and the direct access interface 426.

Figure 5:
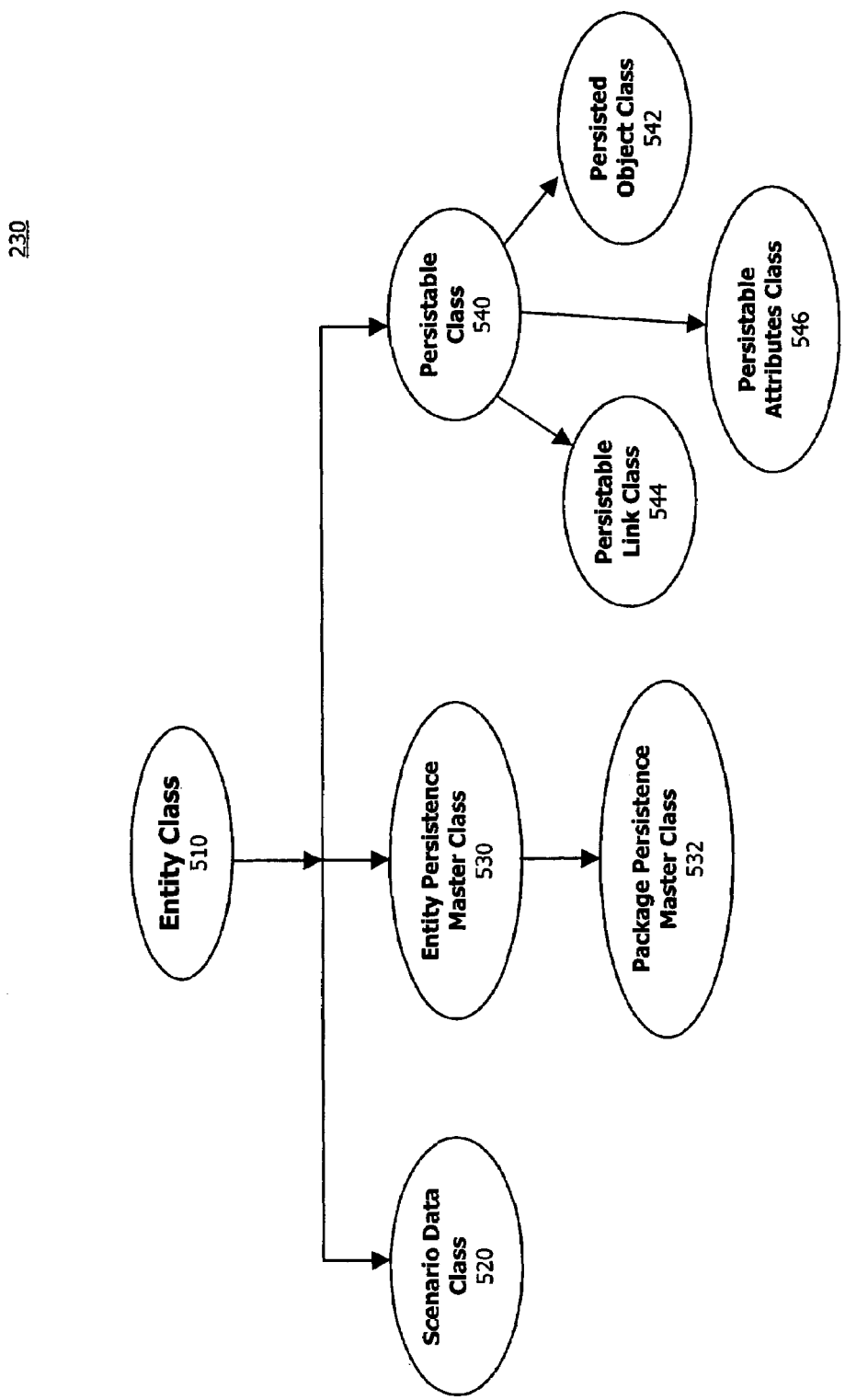
FIG. 5 is a class diagram of an exemplary implementation of the entity model used by the generic data persistence API of FIG. 4.

The entity index interface 422 may outline the basic routines to be used to access entities, including the data to be written or read, in data storage 120. The entities are the data objects used to make data persistent and to store the data. The entities will be described in detail below in FIG. 5. The query interface 424 may outline the basic routines to be used to search data storage 120 and find stored data to be read based on specified search criteria. The direct access interface 426 is an optional interface that may be included when there are special functions in a particular data storage 120 or OS 210 that are not normally part of the generic API. The direct access interface 426 may include the routines for implementing the special functions, when needed.

When the persistence service class 410 is instantiated, the persistence runtime interface, the entity index interface, the query interface, and the direct access interface are implemented to include those routines for managing the particular data storage 120.

The transaction manager interface 430 may outline the basic routines to be used to manage the read and write transactions to the data storage 120, including opening and closing the transactions. The transaction manager interface 430 may include the transaction interface 432. The transaction interface 432 may outline the basic routines that perform the read and write transactions.

When the persistence service class 410 is instantiated, the transaction manager interface and the transaction interface are implemented to include those routines regarding the read and write transactions for the particular data storage 120.

According to embodiments of the present invention, the persistence service class 410 may store the data persistently in any of three ways. In a first case, the persistence service class 410 may store the entire data object tree to represent a persistent data object. The object tree may include the main data object and all dependent data objects. The dependent data objects may include data that is an aggregate or a component of the main data object. This case is similar to the approach currently used by the Java™ VM.

In a second case, the persistence service class 410 may store only dependent data objects to represent a persistent data object. This case reduces the memory requirements by not storing the main object. In this case, the generic API 230 may include routines to reconstruct the main data object from the dependent objects.

In a third case, the persistence service class 410 may store only the attributes and links to represent a persistent data object. The attributes may include the data type, data byte length, etc., and routines that define these attributes. The links may include the routines and data structures, e.g., a hash table, a vector, etc., that define the relationship between all information that make up the data object. This case reduces the memory requirements even further by not storing either the main or dependent data objects of the data. In this case, the generic API 230 may includes routines to reconstruct the main data object from the attributes and the contents of the links.

These embodiments advantageously provide the option of reduced memory requirements and freeing data storage space for other uses.

As mentioned above, the persistence service class 410 may use objects to make the data to be read from and written to the data storage 120 persistent. In one embodiment, the data objects may be structured according to the model in FIG. 5. In this embodiment, the data objects may be instances of an entity class 510. The entity class 510 may include all the attributes that are common to all persistent data storage. The entity class 510 may provide a unique key, entityKey, that may be used by the persistence service class 410 as a reference to an instantiated data object that distinguishes the data object from all others. The unique entityKey advantageously allows the data object to be readily identified by an application, such that the data object may easily be read from and written to persistent data storage. Hence, the entityKey may make the data object persistent such that any application that accesses the persistent memory may reference the object. The entity class 510 may be instantiated by the persistence service class 410 when the application requests data storage. The instantiated entity class may be known as a data object, an entity class object, an entity data object, and an entity, interchangeably.

The entity class 510 may include a scenario data class 520, an entity persistence master class 530, and a persistable class 540. The entity persistence master class 530 may include routines to manage instantiated data objects read from persistent memory and routines to determine the metadata of the instantiated data objects. The entity persistence master class 530 may delegate the actual work of instantiating and reading the data object and metadata to a package persistence master class 532.

When the instantiated persistence service class 410 instantiates the entity class 510, the instantiated package persistence master class may include the routines to enable instantiating and reading of data objects and metadata stored in a particular data storage 120. The instantiated entity persistence master class may then include routines to manage the instantiated package persistence master class.

The persistable class 540 may provide metadata of the data object to be made persistent for the different data storage 120. The persistable class 540 may include a persistable link class 544, a persistable attributes class 546, and a persisted object class 542.

As mentioned above, the persistable link class 544 may include the routines and data structures, e.g., a hash table, a vector, etc., used by the different data storage 120 to define the relationship between all information that makes up the data object. Upon instantiation, the persistable link class object may include the particular routines and data structure used by the particular data storage 120.

The persistable attributes class 546 may include the data type, data byte length, etc., and routines that define these attributes for the different data storage 120. Upon instantiation, the persistable attributes class object may include the particular parameters and routines used by the particular data storage component 120.

The persisted object class 542 may provide a temporary structure to be used to transfer data objects to the persistence service class 410 to be written into during a data write. Conversely, the temporary structure may be used to load instantiated data objects from persistent data storage upon request by the persistence service class 410. Upon instantiation, the persisted object class object may provide the structure of the data objects stored in the particular data storage 120.

The scenario data class 520 may include the routines to be used to instantiate the data objects. One routine may perform the filling of an object from the temporary structure realized by the persisted object class 542 for data read from persistent data storage. Another routine may perform the filling of the temporary structure for data to be written to persistent data storage. Still another routine may instantiate the persistable class object. Upon instantiation, the scenario data class object may perform the data object instantiation and the data reading and writing regarding the particular data storage 120.

It is to be understood that the implementation of the generic API is not limited to the structure described herein, but may include additional classes, interfaces, and other data structures for making data persistent in data storage.

Figure 6:
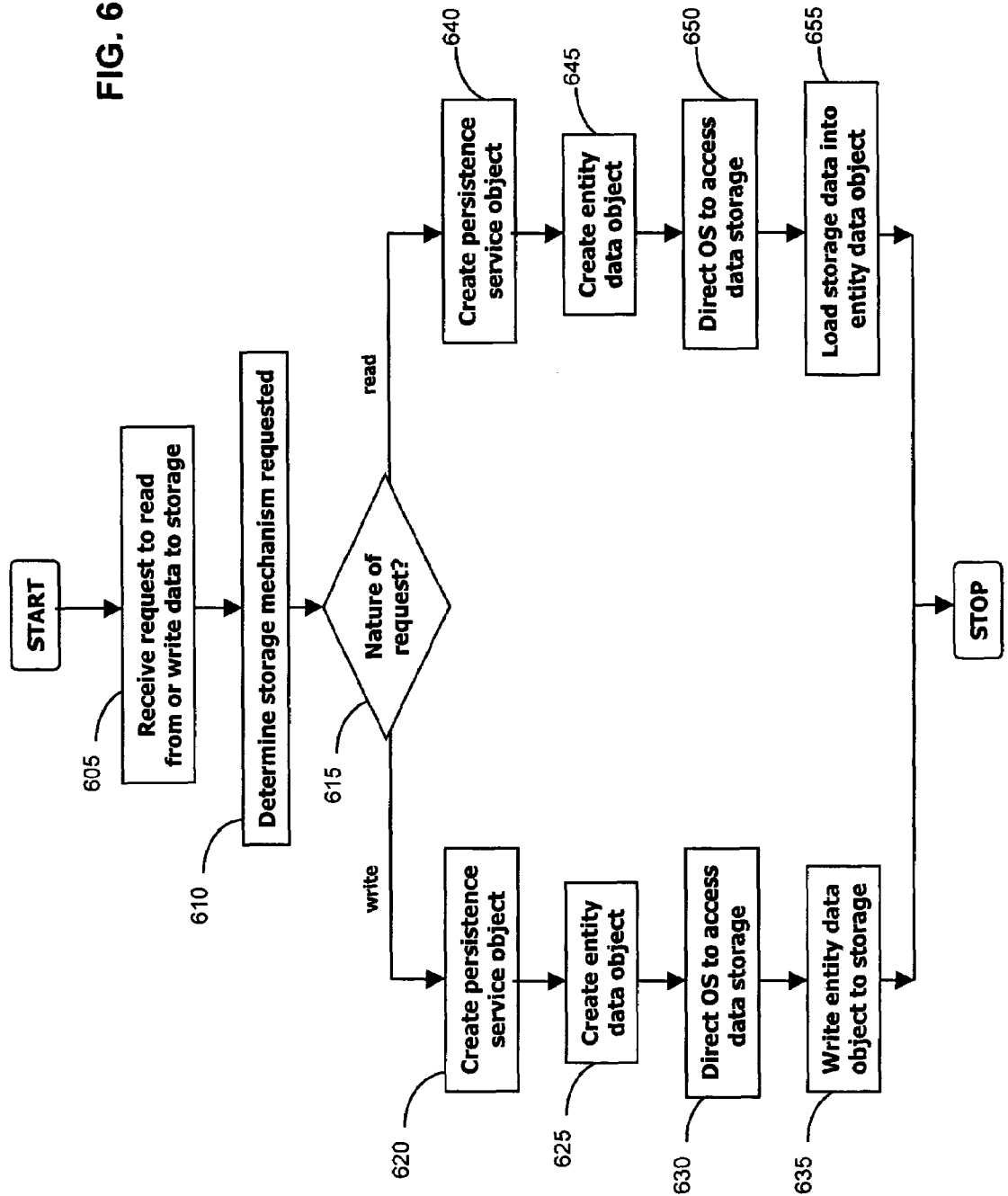
FIG. 6 is a flowchart of an embodiment of a method executing the generic data persistence API.

FIG. 6 is a flowchart of a method according to an embodiment of the present invention. The API may receive (605) a request from an application to read data from or write data to storage. Based on the request, the API may determine (610) the storage mechanism to be used, e.g., file I/O, JDBC, etc., and identify the data storage resource 120 based on this determination. The API may then determine (615) the nature of the request, i.e., whether it is a data read or data write.

If the request is a data write, then the API may create (620) a persistence service object by instantiating the persistence service class and its interfaces and classes associated with the mechanism of the data storage 120. The instantiated persistence service class may then create (625) an entity data object by instantiating the entity class to contain and make the data persistent and write the data to storage. The entity data object may be written with the unique entityKey such that the requesting application or any other application that accesses the persistent storage may reference the object.

The API may then direct (630) the OS to assess the data storage 120. The API may cause the OS to write (635) the entity data object to the data storage 120. The persistence service class may determine how the data is to be written in terms of memory requirements. This determination may be based, for example, on the application requirements.

If the request is a data read, then the API may create (640) the persistence service object. The instantiated persistence service object may then create (645) the entity data object to contain and make the data persistent and read the data from storage.

The API may then direct (650) the OS to read the data from the data storage 120. The API may load (655) the read data into the entity data object. The persistence service class may determine how the data was written to storage and then execute the appropriate routine to load the data into the entity data object.

As an example, the generic API may be used to write data to a file. Upon receiving a request from an application, the generic API may instantiate the persistence service class to include interfaces and classes that execute file data storage. Upon instantiating the persistence service class, the generic API may also instantiate the entity class object into which the data is to be written, including generating the unique entityKey for the object. In this example, the generic API may designate the entire object tree to be written to persistent data storage. The object tree may include the main data object, the dependent objects, and the attributes and links for making stored data persistent in a file.

Next, instantiated persistence service class may implement the transaction manager interface and the transaction interface to include the routines associated with file data storage. The file transaction manager interface may open the file and direct the data to be written to an instantiated entity class object. To do this, the file transaction manager interface may direct the transaction interface to perform the data write to the entity class object, which includes the persisted object, the persistable links, and the persistable attributes.

The instantiated persistence service class may then implement the persistence runtime interface to include the routines for managing file data objects at runtime. The file persistence runtime interface may manage the writing of the instantiated entity class object to the file. The file persistence runtime interface may first save the entityKey in the file. The file persistence runtime interface may then instantiate the entity persistence master class to create a class of file entity class objects. The file persistence runtime interface may next instantiate the persisted object class. The instantiated persisted object class may then instantiate the file entity class created by the entity persistence master. The result is a temporary structure of a file entity class object to be temporarily filled with the data prior to sending to data storage or reading by the application.

After the temporary structure is created, the file persistence runtime interface may instantiate the scenario data class. The instantiated scenario data class may instantiate the file entity class object and load the data from the temporary structure. The file persistence runtime interface may then cause the file links, the file attributes, and the file entity class object (the persisted object) to be written to the file. Next, the file transaction manager interface may then close the file.

In another example, the generic API may be used to read and write data in a JDBC database. The generic API may create a database table and map the instantiated entity class objects to the table. As such, the generic API provides a way for data to be made persistent in the JDBC database and readily written and read as data objects.

Figure 7:
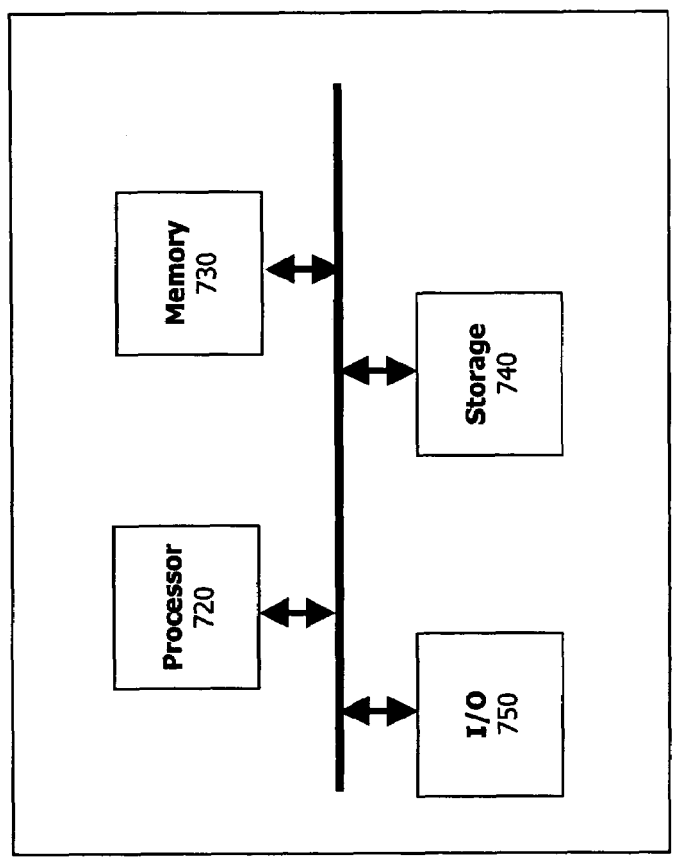
FIG. 7 is a diagram of an exemplary computer for implementing embodiments of the present invention.

FIG. 7 is a block diagram of an exemplary computer that can implement embodiments of the present invention. The computer 110 may create persistent data storage according to embodiments of the present invention. The computer 110 may include, but is not limited to, a processor 720 provided in communication with a system memory module 730, a storage device 740, and an I/O device 750. The processor 720 may execute the generic API, applications, and the OS. The memory 730 may store program instructions to be executed by the processor 720 and also may store variable data generated pursuant to program execution. In practice, the memory 730 may be a memory system including one or more electrical, magnetic, or optical memory devices. The I/O device 750 may include a communication port for communication with external storage 120 to receive and transmit data between the external storage 120 and the computer 110. The storage device 740 may provide the internal storage 120.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
   receiving a request to read or write state data of a virtual machine, the request received from an application executed by the virtual machine;
   selecting a data storage mechanism to use;
   if the request is a data write,
      creating a persistence data object into which to write the data,
      assigning a unique identifier to the persistence data object;
      writing the state data into the persistence data object;
      storing a record of the unique identifier and the persistence data object;
      directing an operating system to access the data storage, and
      writing the data object to the data storage according to the determined data storage mechanism; and
   if the request is a data read, creating a persistence data object to be loaded with the data directing an operating system to access the data storage, locating state data to be read based on a unique identifier associated with a stored persistence data object; and loading the state data from the stored persistence data object into the created persistence data object according to the determined data storage mechanism.

2. The method of claim 1, wherein the data storage mechanism is defined by a plurality of parameters.

3. The method of claim 1, wherein the data storage mechanism is selected from the group consisting of: byte array read/write, file I/O, and Java Database Connectivity (JDBC).

4. The method of claim 1, wherein the selected data storage mechanism is specified by the request.

5. The method of claim 1, wherein the operations performed if the request is a data write and the operations performed if the request is a data read are implemented by generic routines shared by a plurality of data storage mechanisms.

6. A computer-readable medium storing instructions which, when executed by a processor, cause the processor to perform a method comprising:

receiving a request to read or write state data of a virtual machine, the request received from an application executed by the virtual machine;

selecting a data storage mechanism to use;

if the request is a data write, creating a persistence data object into which to write the data, assigning a unique identifier to the persistence data object;

writing the state data into the persistence data object;

storing a record of the unique identifier and the persistence data object;

directing an operating system to access the data storage, and writing the data object to the data storage according to the determined data storage mechanism; and if the request is a data read, creating a persistence data object to be loaded with the data directing an operating system to access the data storage, locating state data to be read based on a unique identifier associated with a stored persistence data object; and loading the state data from the stored persistence data object into the created persistence data object according to the determined data storage mechanism.

7. The computer-readable medium of claim 6, wherein the data storage mechanism is defined by a plurality of parameters.

8. The computer-readable medium of claim 6, wherein the data storage mechanism is selected from the group consisting of: byte array read/write, file I/O, and Java Database Connectivity (JDBC).

9. The computer-readable medium of claim 6, wherein the selected data storage mechanism is specified by the request.

10. The computer-readable medium of claim 6, wherein the operations performed if the request is a data write and the operations performed if the request is a data read are implemented by generic routines shared by a plurality of data storage mechanisms.

* * * * *